June 19, 1945.  M. M. WEAVER  2,378,522

THRESHED STRAW BUNDLER

Filed June 8, 1943  3 Sheets-Sheet 1

Martin M. Weaver
INVENTOR.

BY
Victor J. Evans & Co.
ATTORNEYS

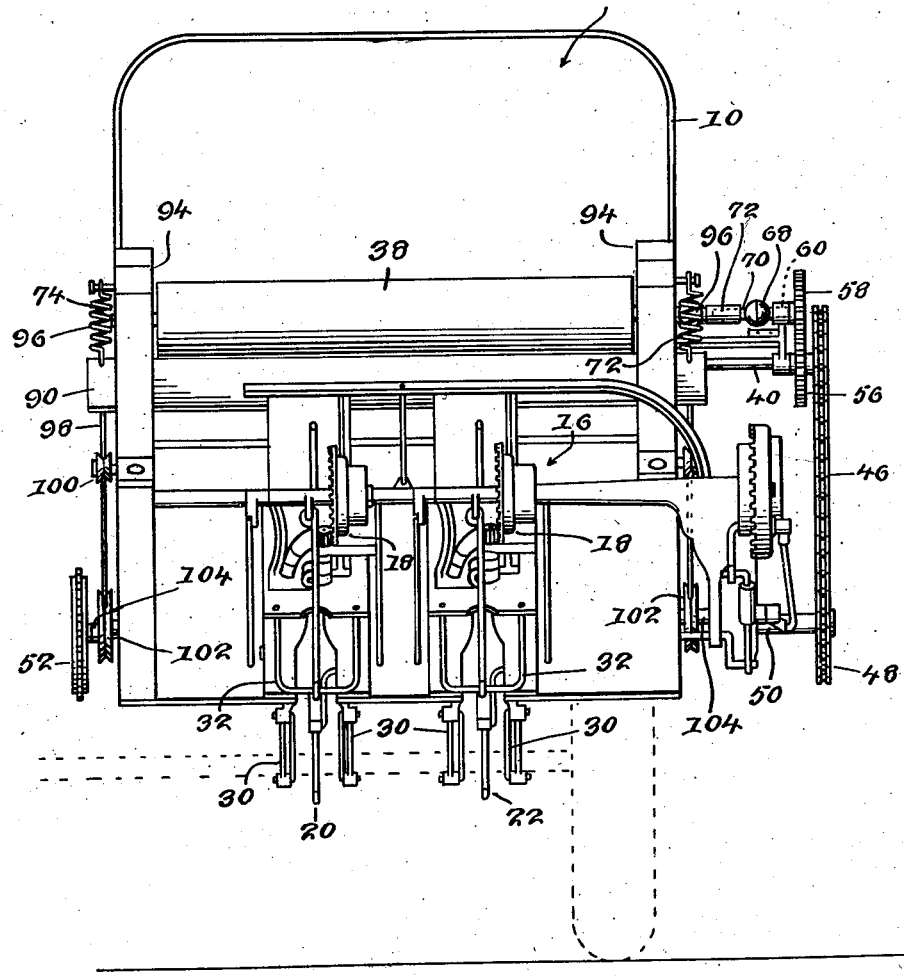

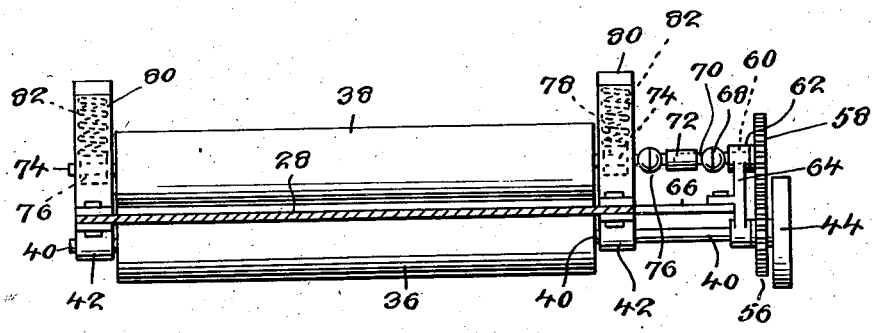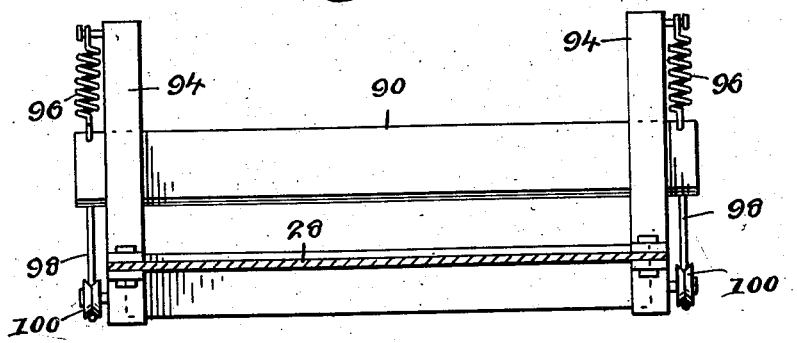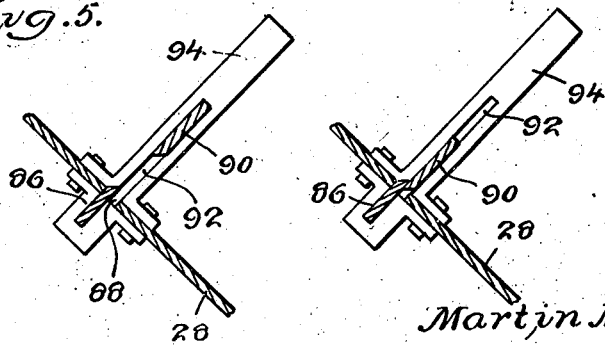

Patented June 19, 1945

2,378,522

UNITED STATES PATENT OFFICE 2,378,522

THRESHED STRAW BUNDLER

Martin M. Weaver, Bareville, Pa.

Application June 8, 1943, Serial No. 490,069

8 Claims. (Cl. 56—439)

My invention relates to combine harvesters, and has among its objects and advantages the provision of an improved threshed straw bundling attachment wherein the straw is passed through pressure rollers as it comes from the thresher to be packed into a compact mass, in which a novel cutter means is provided for cutting the slab of straw emerging from the rollers as the bundle is being tied, and in which two strings are tied about the bundle to securely hold the straw in a neatly formed bundle.

In the accompanying drawings:

Figure 2 is a face view of the binder head looking into the open end of the straw discharge.

Figure 3 is a side view of the pressure rollers.

Figure 4 is a side face view of the cutting blades.

Figure 5 is a sectional view along the line 5—5 of Figure 1.

Figure 6 is a similar view with the cutting blades in another position, and

Figure 1:
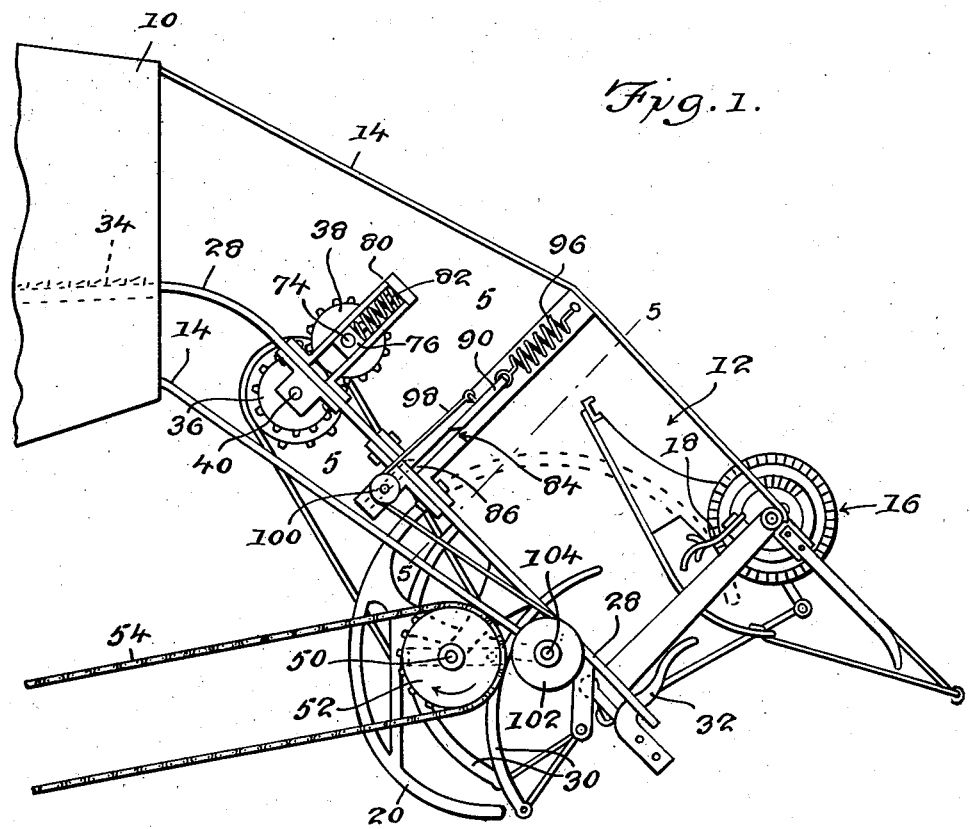
Figure 1 is a side view of my invention in association with the threshed straw discharge end of a conventional combine thresher.
Figure 7:
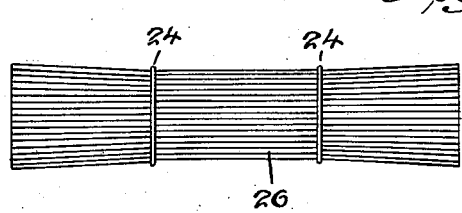
Figure 7 is a view of a straw bundle showing the two strings tied around the bundle.

In the embodiment of the invention selected for illustration, I make use of a combine harvester, the straw discharge end 10 of which is shown in Figures 1 and 2, of the type which cuts and threshes the grain and drops the threshed straw upon the field. Upon the combine is mounted a bundling device 12, as by frame members 14. The device 12 includes a binder head 16 which is identical with a conventional grain binder head, with the exception that two knotter units 18 and two needles 20 and 22 are employed.

The knotters and needles are spaced for tying two strings 24 about the bundle 26, which strings are spaced sufficiently far apart to hold the straw in a neat and firmly packed bundle. The binder head 16 includes the usual grain supporting board 28 and packers 30 for each needle 20 and 22. Two trip levers 32 are employed which operate as a unit to set the tying mechanism into operation whenever as predetermined straw pressure is applied to either or both.

The grain board 28 is extended up to a line closely adjacent the straw discharging rack 34 of the combine as a supporting floor for the straw as it moves into the bundling mechanism. Upon the board 28 are mounted two straw packing rollers 36 and 38. The two rollers extend transversely of the board 28 and lie in a plane at right angles to the board, with the greater circumferential face of the roller 36 lying beneath the board 28, but with a small area thereof projecting through an opening in the board for pressure coaction with the roller 38.

The roller 36 is fixed to a shaft 40 rotatably supported in bearings 42 attached to the board 28, and this shaft has a drive sprocket 44 attached thereto for connection with a chain 46 passing around a sprocket 48 attached to the packer operating shaft 50 of the bundling device. This shaft is driven by a sprocket 52 connected with a chain 54 driven from a suitable power take-off shaft (not shown) of the combine.

A gear 56 is attached to the shaft 40 and meshes with a gear 58 keyed to a shaft 60 rotatably supported in a bearing 62 on a bracket 64 mounted on an extension 66 on the board 28. A universal joint 68 connects the shaft 60 with a square shaft 70 slidably mounted in a correspondingly contoured socket 72. This socket is operatively connected with a shaft 74 by a universal joint 76. Bearings 78 support the shaft 74, and the roller 38 is fixed to this shaft.

Both bearings 78 are slidably mounted in guides 80 and are urged downwardly in the guides by compression springs 82, so that the roller 38 is yieldingly pressed against the roller 36. The two rollers are preferably formed of resilient material such as rubber, and each has a diameter of ten inches.

Between the rollers 36 and 38 and the binder head 16 is located a straw cutter 84. This cutter comprises a fixed blade 86 extending through a slot 88 in the board 28, and a movable blade 90 slidably guided in slots 92 in bars 94 attached to the board 28 and two of the frame members 14. Tension springs 96 are attached to the ends of the blade 90 and the bars 94 to yieldingly hold the blade in an upper position spaced from the blade 86 so that the slab of compacted straw emerging from between the rollers 36 and 38 may pass between the blades as it progresses into the bundling mechanism.

The blades 86 and 90 extend transversely of the board 28 in a plane close to the needles 20 and 22, so that the straw is cut close to the paths of the two needles. Means for actuating the blade 90 comprises pull lines 98 attached to the end margins of the blade and passed around grooved wheels 100 located beneath the board 28. Both lines are attached to grooved wheels 102 fixed to the needle operating shaft 104. The wheels 102 are of such diameters as to pull the lines 98 sufficiently far to bring the blade down to the position of Figure 6 to cut through the straw. The blade 90 is caused to move downwardly as soon as the needle shaft 104 is turned. Thus the blade 90 is timed with the needle action so as to cut the straw slab as the bundle is being formed.

The spacing between the rollers 36 and 38 and the blades 86 and 90 is ample to handle the straw that is passing through the rollers while the blade 90 is down so as not to cause an objectionable amount to pile up against the blade, so that the straw will flow easily through the cutter as soon as the blade moves upwardly.

Without further elaboration, the foregoing will so fully explain my invention, that others may, by applying current knowledge, readily adapt the same for use under various conditions of service.

The operation of the device is as follows: The straw passes from the discharge end 10 of the harvester on the grain board 28, between the packing rollers 36 and 38, where it is compressed between the same. The rollers feed it outwardly where the ends of the bunch of straw is cut off by the knife 90. The packers 30 hold the bundle of straw in its compressed condition and simultaneously the two needles 20 and 22 pass the two strings 24 around the bundle and the knotters tie the strings by pressure of the straw against the trip levers 32.

I claim:

1. In a thresher having a straw discharge and a grainboard extending adjacent the straw discharge, the combination of two driven rollers for packing the straw emerging from the straw discharge and as it passes down the grain board, a bundling device for the packed straw near the end of the grain board, and means located between said means for packing the straw and said bundling device for cutting the straw in a predetermined timed order with respect to the bundle forming action of said bundling device.

2. In a thresher having a straw discharge and a grainboard extending adjacent the straw discharge, the combination of means for packing the straw emerging from said straw discharge and as it passes down the grain board, a bundling means having a string tying needle means for bundling the packed straw, and a packed straw cutting means operated in a predetermined timed order with respect to the tying action of said needle means.

3. In a thresher having a straw discharge and a grainboard extending adjacent the straw discharge, the combination of rollers one below, and one above the grain board for packing the straw emerging from the straw discharge, a bundling device having a rotary packer shaft and a rotative needle shaft, a packed straw cutter interpolated in the path of the straw on the grain board, an operating connection between said packer shaft and at least one of said rollers, and an operating connection between said cutter and said needle shaft whereby said cutter is operated in a predetermined timed order with respect to said bundling device.

4. In a thresher having a straw discharge and a grainboard extending adjacent said straw discharge, the combination of rotary means interpolated in the path of the straw on the grain board for packing the straw emerging from the straw discharge, a bundling device having a plurality of knotters and of coacting needles for tying two strings about the bundles, and a packed straw cutter operated in predetermined timed order with respect to the action of said needles.

5. The invention described in claim 1 wherein said first mentioned means comprises two rollers one extending through an opening in the grainboard, and the other located above the first roller and means for yieldingly pressing the upper roller against the other.

6. The invention described in claim 1 wherein said first mentioned means includes a pair of rollers in the path of straw on the grain board, one of which is a roller, the other being a positively driven roller driving the first roller, and resilient means yielding urging the positively driven roller against said free roller.

7. The invention described in claim 3 wherein one roller is mounted for relative lateral movement with respect to the other roller, spring means yieldingly urging the said one of said rollers against said other roller, and a universal joint means and telescopic means interposed in the operating connection between said packer shaft and the said one of said rollers.

8. The invention described in claim 3 wherein said cutter is interpolated in the path of the grainboard and includes a stationary blade and a movable blade coacting therewith, resilient means connected with said movable blade for normally holding that blade in a retracted position with respect to the stationary blade, said operating connection between the cutter and said needle shaft comprising spool like bodies fixed to said needle shaft, and pull lines attached to said spool like means and said movable blade for pulling the latter into cutting position with respect to the fixed blade upon initial string tying movement of the needle shaft.

MARTIN M. WEAVER.